(12) United States Patent
Saito et al.

(10) Patent No.: US 6,460,087 B1
(45) Date of Patent: Oct. 1, 2002

(54) METHOD OF TRANSFERRING FILE

(75) Inventors: Masahiro Saito, Tokyo; Takanori Kobayashi, Saitama; Satoru Takagi; Atsushi Ito, both of Tokyo, all of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/256,758

(22) Filed: Feb. 24, 1999

(30) Foreign Application Priority Data

Feb. 25, 1998 (JP) ............................................. 10-059057
Apr. 9, 1998 (JP) ............................................. 10-112882

(51) Int. Cl.[7] ............................................. G06F 13/00
(52) U.S. Cl. ........................ 709/236; 709/232; 709/200; 710/21; 710/20; 370/465
(58) Field of Search ................................. 709/230, 232, 709/200, 236; 710/20, 21, 105, 106, 52; 707/10, 1; 370/464, 465

(56) References Cited

U.S. PATENT DOCUMENTS 5,684,716 A * 11/1997 Freeman ...................... 345/723
6,003,045 A * 12/1999 Freitas et al. ................ 707/205
6,018,780 A * 1/2000 Fenchel ....................... 710/105
6,105,029 A * 8/2000 Maddalozzo, Jr. et al. ... 707/10
6,192,412 B1 * 2/2001 Cantoral et al. ............. 709/236

* cited by examiner

Primary Examiner—Kenneth R. Coulter
(74) Attorney, Agent, or Firm—Arent Fox Kintner Plotkin & Kahn, PLLC

(57) ABSTRACT

A method of transferring file of the present invention by the two simultaneous data transmissions comprises the steps of transmitting data in a forward direction starting from a first specified position to a bottom in the file, and transmitting data in a backward direction starting from a second specified position to a top in the file. And a method of transferring file in FTP of the present invention comprises the steps of establishing a control connection, establishing multiple data connection, dividing a file into segments from each arbitrary point in the file, transferring segments through each of the multiple data connections, respectively, and synthesizing file from the segments transferred through the multiple data connections.

20 Claims, 5 Drawing Sheets

METHOD OF TRANSFERRING FILE

FIELD OF THE INVENTION

The present invention relates to a method, an apparatus and a recorded media which contains program codes, of transferring file through multiple data connections.

Also this invention relates to a method of transferring file by FTP (File Transfer Protocol:RFC959) in wide area networks by TCP (Transmission Control Protocol).

DESCRIPTION OF THE RELATED ART

Figure 1:
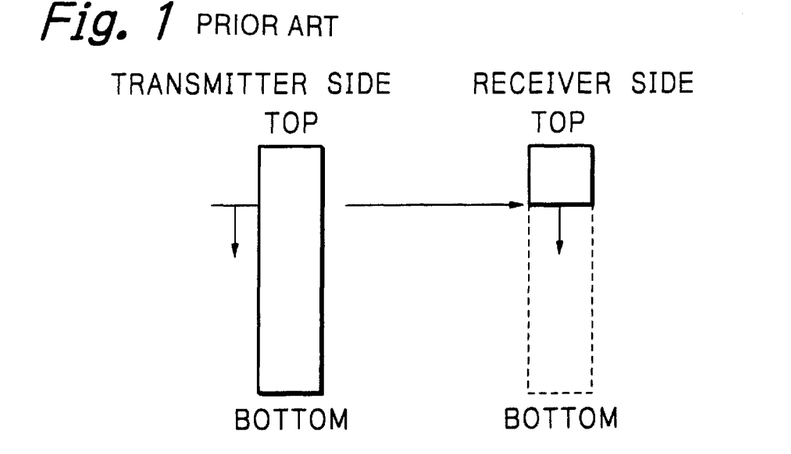
FIG. 1 shows a file transferring method by a single connection according to the prior art.

The FIG. 1 briefly shows a file transferring method by a single data connection according to a prior art. By the method, file data transferring is done in the forward direction sequentially from the top of the file to the bottom. This method is widely used in FTP (File Transfer Protocol) of the internet.

In the internet, which is widely used in wide area networks, FTP is mainly used as a file transferring protocol between a client and a server.

FTP consists of three major phases of transferring between a client and a sever via a transmission line, firstly establishment phase of a control connection, secondly establishment phase of a data connection using the established control connection, thirdly phase of file transferring of transmitting and receiving using the established data connection.

A file server system is usually accessed by many and unspecified clients. Depending upon the number of simultaneously accessing clients and sizes of transferring files, the rate of the transmission speed is very degraded, and or the data connection is terminated by time-out processing. The cause is the limitation of the processing capability of the server system or the fluctuation of data transfer rate of the used transmission line. This kind of problem is frequently happens at transferring large size files including animation data.

Recently the processing capability of the micro-processor in a computer and various peripheral equipment are greatly enhanced, on the other hand the data transferring capability of the actually available data transmission line is not improved so much and still remains low. Therefore the low capability of data transmission line is the bottle neck of the data connection.

The mostly used high level protocol FTP for file transferring establishes a control connection and a data connection between a file server and a client. From FTP function point of view, only one data connection is used without reflecting the actual situation of data rate of the used transmission line.

Figure 2:
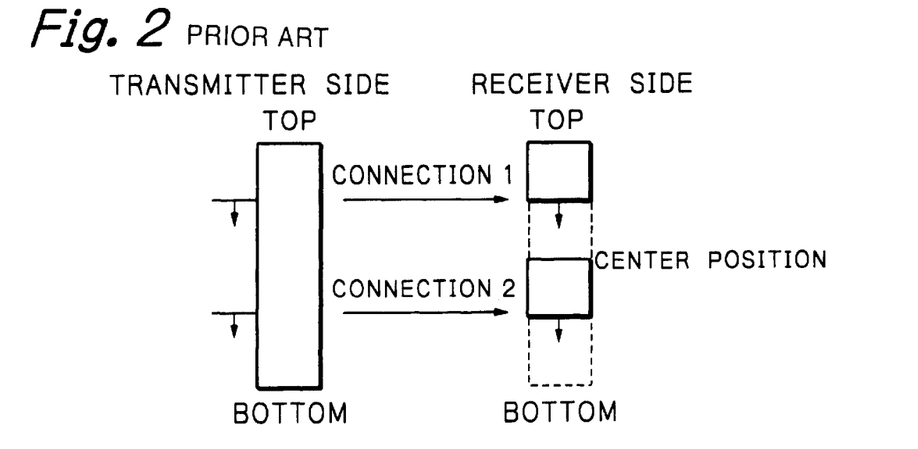
FIG. 2 shows a file transferring method by using two connections according to the prior art.

The FIG. 2 shows a file transferring method by using two connections according to the prior art. In this method, the transferred file is divided into two segments, and each segmented file is sent in the forward direction sequentially from the top of the segmented file to the bottom via separated two data connections, and as a result overall the transmission efficiency can be improved. The efficiency becomes maximum when each segmented file transmission is finished at the same time. In this method the same size of data is assigned to each connection, the division point is determined based on the total file size. In the case of the FIG. 2, the transferred file is divided at the center of it, and two segmented files are transferred by two different connections.

However, under the actual environment of time dependent fluctuation of data transmission rate in the internet including satellite communication, the two different connections do not necessarily have the same transmission rate, and hence each segmented file transmission is not finished at the same time. Actual transmission time is determined by the lower transmission rate connection. The higher rate connection can send the same size file data for shorter time. The resource of the higher rate connection is not effectively used in this case.

SUMMARY OF THE INVENTION

It is therefore an object of the present invention to resolve the problems shown in the previous paragraphs, and to provide a method, an apparatus and a recorded media which contains program codes, of high efficient file transferring utilizing multiple data connections for transmission of a file.

Another object of the present invention is to provide a method of establishing a wide band width transferring in FTP environment.

The present invention provides a method of transferring file by two simultaneous data transmissions, said method comprising the steps of: transmitting data in a forward direction starting from a first specified position to a bottom in the file; and transmitting data in a backward direction starting from a second specified position to a top in the file.

According to an embodiment of the invention, the first specified position is the top of the file and the second specified position is the bottom of the file.

According to an embodiment of the invention, the file transferring is finished when the two data transmissions in the forward and backward directions reach at a same position in the file.

According to an embodiment of the invention, the first position and the second position are the same point in the file.

According to an embodiment of the invention, the file transferring is finished when the data transmission in the forward direction reaches the bottom of the file and the data transmission in the backward direction reaches the top of the file.

According to an embodiment of the invention, the data transmission in the forward direction is done by the first connection, and the data transmission in the backward direction is done by the second connection.

According to an embodiment of the invention, using only one connection the forward direction and the backward direction transmissions are alternatively done at every specified interval points in the file.

The present invention provides a method of transferring file comprising the steps of establishing a first connection by which a data is transmitted in a forward direction started from a top of a file to be transferred, and at the same time, establishing a second connection by which a data is transmitted in a backward direction started from a bottom of the file, and establishing a third connection by which a data is transmitted in a backward direction started from a certain point around an effective center area of the file, and at the same time, establishing a fourth connection by which a data is transmitted in a forward direction started from the point around the effective center area of the file.

The present invention provides a method of transferring file comprising the steps of: establishing a first connection by which a data is transmitted in a forward direction started from a top of a file to be transferred; at the same time, establishing a second connection by which a data is transmitted in a backward direction started from a bottom of the file; establishing a third connection by which a data is transmitted alternatively in a forward direction and a backward direction at every specified unit data from a certain point around the effective center area of the file.

The present invention provides an apparatus for transferring file by two simultaneous data transmission, said apparatus comprising means for transferring file in a forward direction starting from a first specified position in a file, and means for transferring file in a backward direction starting from a second specified position in the file.

The present invention provides a recorded media for storing control program codes which enables two simultaneous data transmissions by transmitting data in a forward direction starting from a first position in the file, and by transmitting data in a backward direction starting from a second position in the file.

The present invention provides a method of transferring file in FTP (File Transfer Protocol: RFC959) comprising the steps of: establishing a control connection; establishing multiple data connection; dividing a file into segments from each arbitrary point in the file; transferring segments through each of the multiple data connections, respectively; and synthesizing file from the segments transferred through the multiple data connections. Accordingly, it enables more wide band width for data transmission than by prior art method using only one connection.

According to an embodiment of the invention, the dividing step includes a step of determining the number of transferring start points in the file as many as the number of the multiple data connections.

According to an embodiment of the invention, the dividing step includes a step of dividing the file into the segments at the transferring start points, and the transferring step includes a step of sending to and receiving from the data connection via transferring buffers.

According to an embodiment of the invention, the method further comprises a step of determining the number of data connections depending upon the size of file to be transferred and command response time after the control connection establishing step is executed.

According to an embodiment of the invention, the command response time is obtained by measuring the time spent for establishment of control connection and by measuring the response time from the supervising command transmit to the acknowledge and status information reception.

According to an embodiment of the invention, the received acknowledge and status information to the transmitted supervising command contain the values of (present number of accesses)/(possible maximum number of accesses) and (present used band width)/(allocated band width).

According to an embodiment of the invention, the response time is periodically measured. Accordingly, it may dynamically changes the number of data connections reflecting the conditions of the used transmission lines during communication, and by this method data receiving can be re-started successively from the normally received portion of a file even when a data connection is terminated due to worsened transmission condition, because another data connection is established.

According to an embodiment of the invention, each of the number of data connections is monitored, and re-determination of necessary number of data connections and re-allocation of data connections are dynamically done depending upon fluctuation of the file transmission efficiency of at least one of the data connections. Accordingly, the present invention provides a method to enable dynamical establishment of a new connection when one of used data connections is terminated due to some trouble.

According to an embodiment of the invention, all of above-mentioned steps are done by GET or PUT command issue in the client side. Accordingly, client operators can do their jobs independently without any involvement to the described communication control processing according to the present invention.

By the present invention, an effective file transferring method getting wide band width for data transmission under FTP communication between a file server and a client is provided.

Further objects and advantages of the present invention will be apparent from the following description of the preferred embodiments of the invention as illustrated in the accompanying drawings.

DESCRIPTION OF THE PREFERRED EMBODIMENTS

Figure 3:
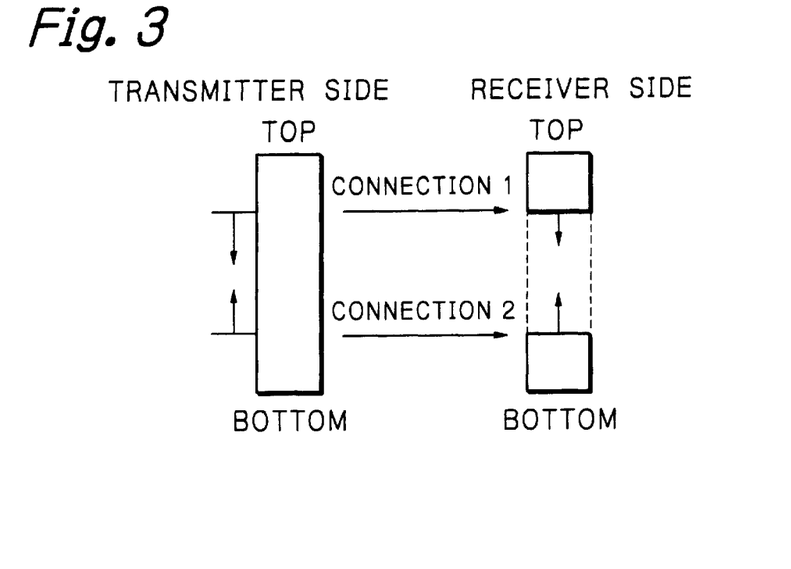
FIG. 3 shows a method of transferring file using two connections according to the present invention.

The FIG. 3 shows a method of transferring file using two connections according to the present invention. In the FIG. 3 there are two connections, the one connection 1 transmits the file data starting from the top of the file in the forward direction, and the other connection 2 transmits the file data starting from the bottom. When the two transmitted data of forward and backward directions reach at a certain point, the file transferring is completed. The two data transferring by two connections always finish at the same time. The higher efficient connection can cover the lesser one. It is not necessary to calculate the division point for file segmentation.

Figure 4:
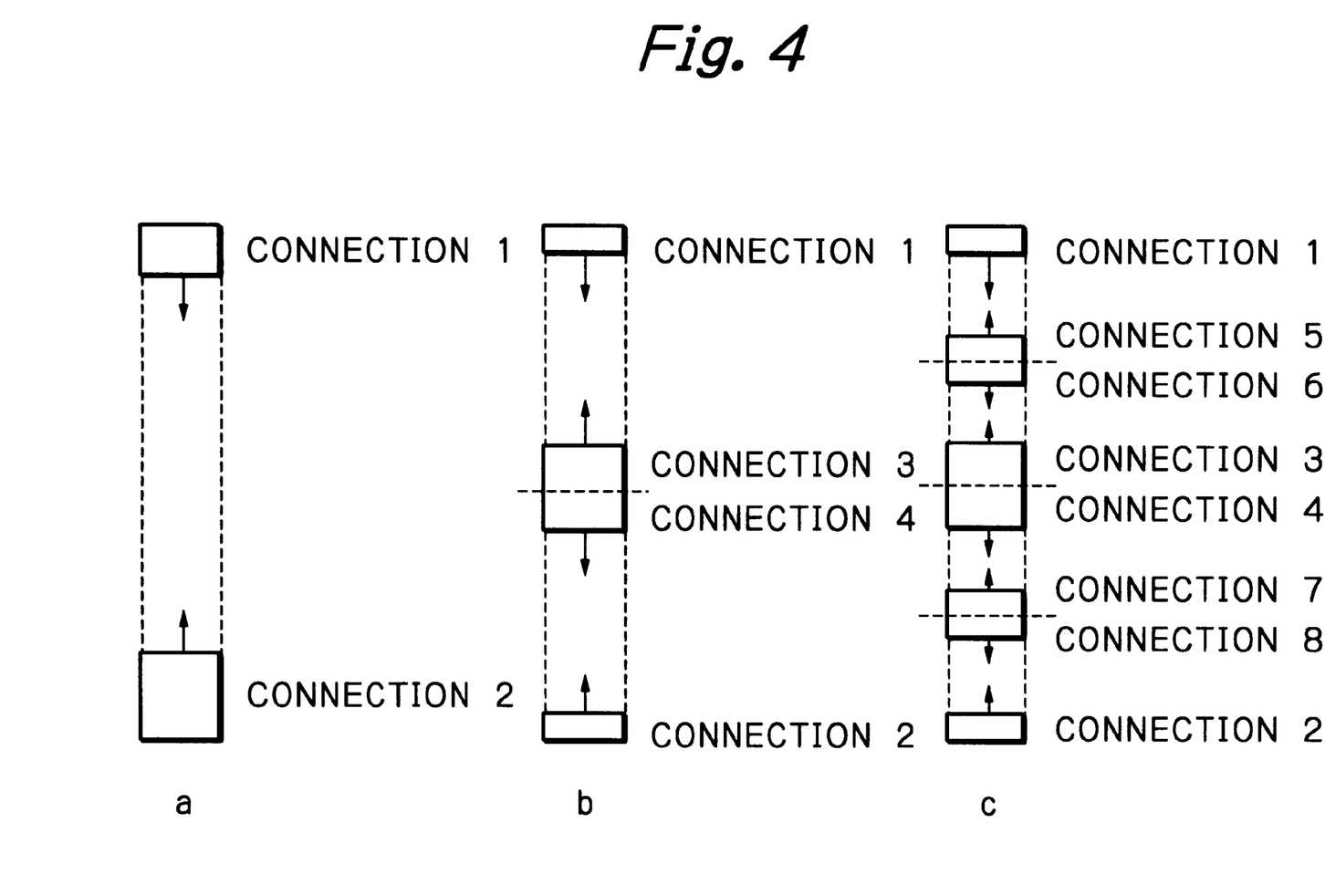
FIG. 4 shows another method of transferring file using more than three connections based on the principle in the FIG. 3 according to the present invention.

The FIG. 4 shows another method of transferring file using more than three connections according to the present invention. During communication, first the two connections are used for data transferring in both of the forward direction from the top of the file and the backward direction from the bottom of the file as shown in the FIG. 4a. When the transmitted file size is large and more connections can be allocated in the used network, more two connections, which are activated at the center of the remaining file data area, are established as shown in the FIG. 4b. At that time the overhead for establishing more connections must be taken in account. In the FIG. 4b, the connection 3 does the data transmission in the backward direction form the center point, and connection 4 does the data transmission in the forward direction from the center point. The transmission efficiency becomes maximum when the meeting time of the connections 1 and 3 and the meeting time of the connections 2 and 4 are just same. However, if the data transmission rates of the four connections are not the same, each file transferring is not completed at the same time. In this case more connections can be established as shown in the FIG. 4c.

Figure 5:
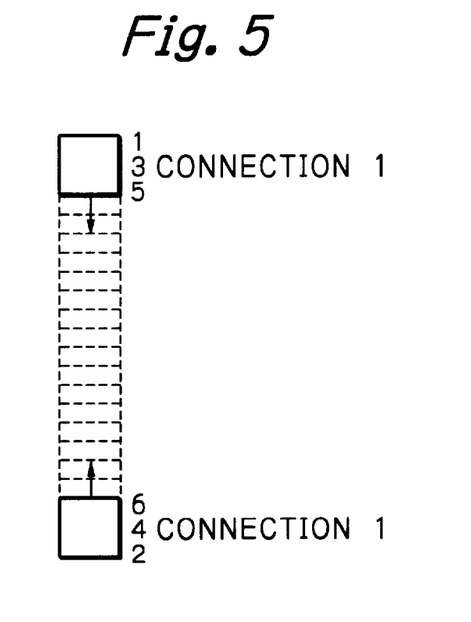
FIG. 5 shows a method of transferring file using one connection based on the principle in the FIG. 3 according to the present invention.

The FIG. 5 shows a method of transferring file using one connection based on the principle of operation shown in the FIG. 3. Using only one connection, the forward direction and the backward direction transmissions are alternatively done at every specified interval points in the transferred file. The data transmission rates of the forward and backward directions are one half of usual connection and equal each other.

Figure 6:
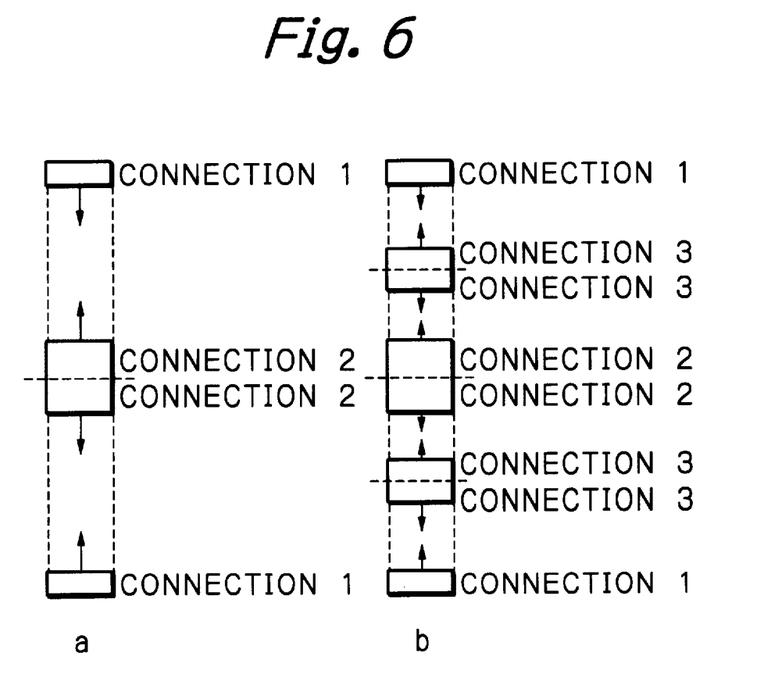
FIG. 6 shows a method to improve file transferring in the FIG. 4 applying the file transferring shown in the FIG. 5 according to the present invention.

The FIG. 6 shows a method to improve file transferring in the FIG. 4 applying the file transferring shown in the FIG. 5. In comparison with the FIG. 4, a connection is used for both forward and backward directional data transmissions started at the center position of a segment of the transferred file. This is done by the way in which the forward direction and the backward direction transmissions are alternatively done at every specified interval points in the transferred file. The data transmission rates of the forward and backward directions are one half of usual connection and equal each other. The specified interval points cam be defined at bits or bytes unit. In this case the timing of the termination of data transmission is at a time after all the connections meet their associated connections in their allocated file data segments.

In the FIG. 4, for high efficient data transmission, the connection 3 and 4 in the FIG. 4b and the connection 5, 6, 7 and 8 in the FIG. 4c should be established at the same time. On the other hand in the FIG. 6, it is not necessary to establish the connections at the same time. Taking the overhead for more connections and the transmission band width in account, there are cases in which the method in the FIG. 6 is much more effective than that in the FIG. 4.

Figure 7:
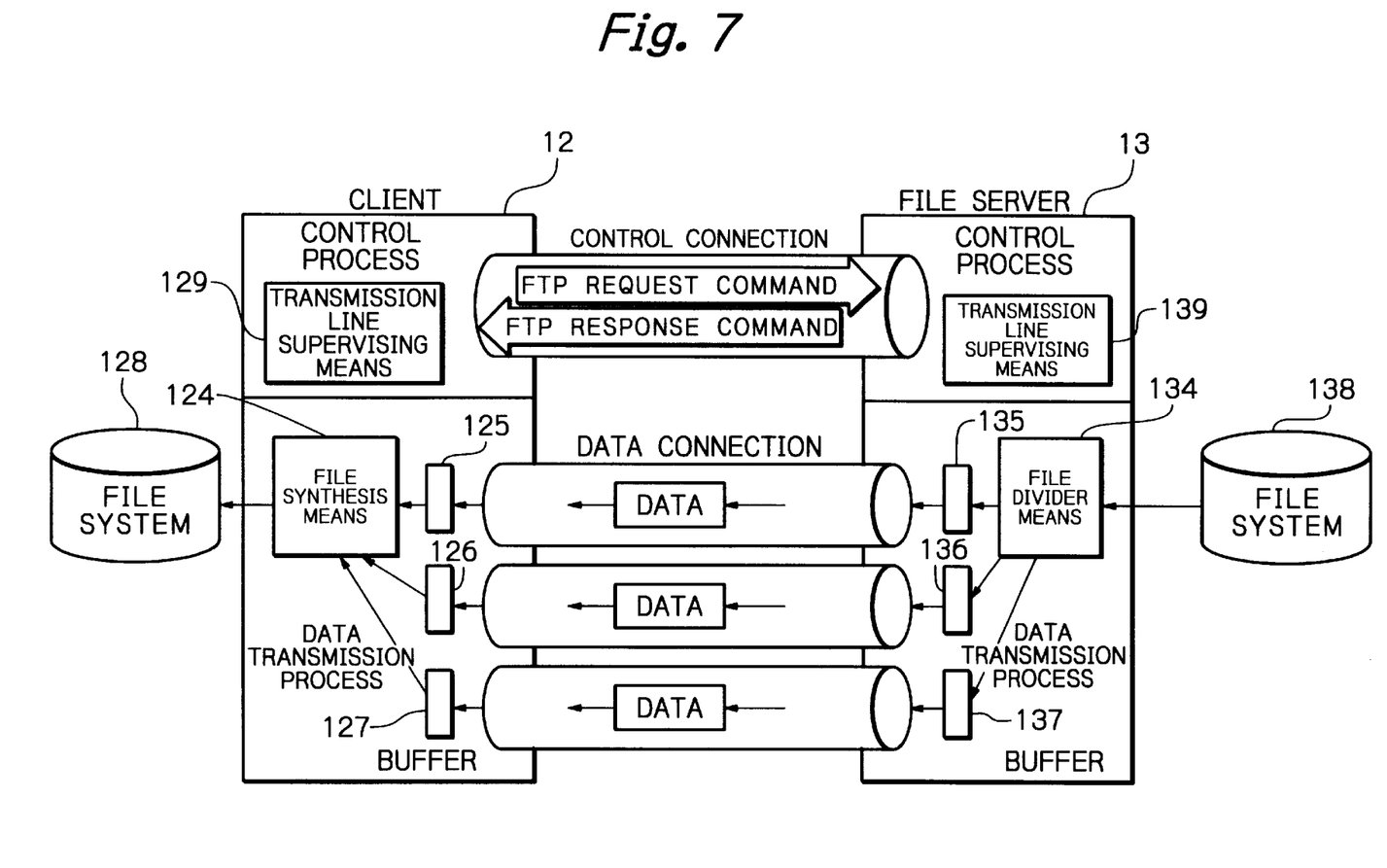
FIG. 7 shows the system configuration for down load operation according to the present invention.

The FIG. 7 shows the system configuration of file transmission for down load operation according to the present invention. The client 12 has a file system 128, the file server 13 has a file system 138 respectively. The client 12 and the file server have control processes to establish a control connection, and data transmission processes to establish data connections. The data transmission processes have capability to establish multiple data connections.

The control connection does transmitting and receiving control commands for the establishment of a data connection and its termination. Establishment and termination of multiple data connections can be done by the control connection. The control processes have the supervising means 129 and 139 onto the used transmission lines, and watch the status of the lines by transmitting and receiving the supervising commands.

In order to transmit and receive a file using multiple data connections, the file must be divided into some segments. Therefore the data transmission process in the transmitter side has the file divider function 134, and the data transmission process in the receiver side has the file synthesis function 124. The server assigns indexes to divided file segments and generates a map of each relation between an index and a data connection. Based on the map, the file transferring is to be done through multiple connections.

The divided file segments generated by the file divider function 134 are temporally stored in the buffers 135, 136 and 137, then transmitted from the buffers. While the received data through the multiple data connections are temporally stored in the buffers 125, 126 and 127, then the file synthesis function 124 synthesizes the original file from stored data in the buffers.

An operator of the client can do data transferring process by usual FTP down load GET command. When a GET command is issued, the number of data connections is determined depending upon the transferred file size and transmission line condition and the data connections are established. The client can do down load operation in the same way of usual FTP.

On the other hand the up load operation, in which a file is transferred from the client to the file server, is quite similar to the down load operation. In this case the data process in the FIG. 7 is just exchanged. The operator of the client can do data transferring process by usual FTP up load PUT command, and a certain number of data connections are established.

Figure 8:
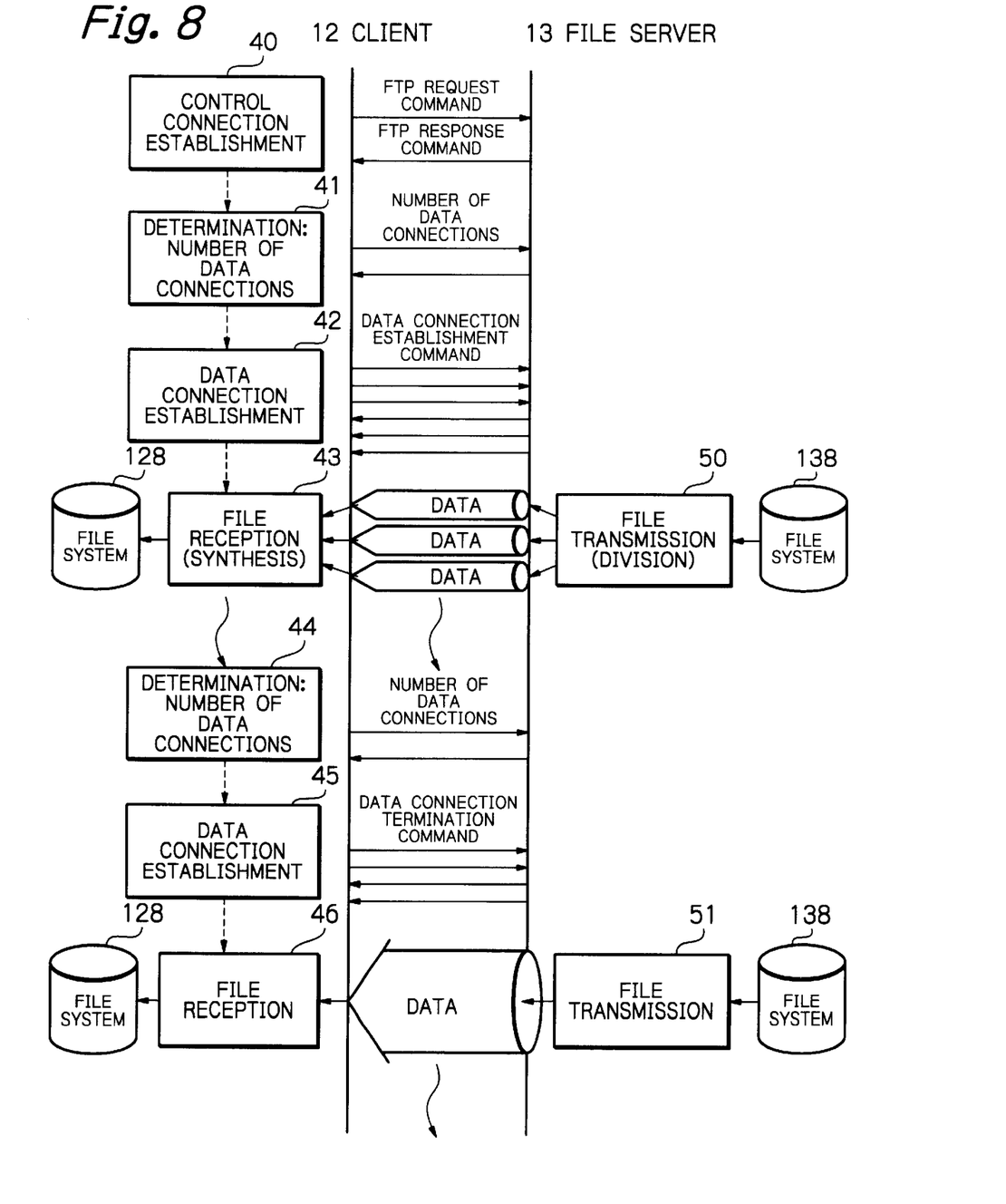
FIG. 8 shows a sequence of the file transferring flow according to the present invention.

The FIG. 8 shows a sequence of the file transferring flow for down load operation according to the present invention.

Firstly the client 12 establishes a control connection with the file server 13 by the control connection establishment phase 40, and transmits a FTP request command. Then the client 12 receives a FTP acknowledge command. At this phase the client measures the time from the request command transmit to the acknowledge command receive. This measured response time is useful to the phase of determination of the number of data connections 41. Longer response time means that the used transmission line condition is worse.

Secondly the client 12 determines the number of data connections at the phase of determination of the number of data connections 41. The the number of data connections is determined depending upon the transferred file size and the response time measured at the control connection establishment phase 40.

For transferring a file of large size, large number of data connections should be established even if increased overhead by file division and connection allocation is required. On the other hand for transferring a file of small size, the established number of data connections should be minimized. When the condition of the used transmission lines becomes worse, more number of data connections should be established. And when the condition is recovered, the number of data connection can be reduced.

This overall decision determines the actual number of data connections. The overall decision means that even a large size file should be transferred without increasing the number of data connection under good condition of the transmission lines.

Thirdly the client 12 establishes the data connections, whose number is determined at the determination phase of the number of data connections 41, at the establishment phase of the data connections 42.

Fourthly at the transferred file division phase 50 in the file server and received file synthesis phase 43, the file is transmitted and received through the established number of data connections.

Fifthly during the file transferring operation, the condition of data transmission of each data connection is supervised, and re-determination or adjustment of the number of data connections is done depending upon the transmission line condition change of getting worse or recovering.

At control connection, supervising commands like PING are periodically transmitted and received. By measuring the response time from the supervising command transmit to the acknowledge command receive, the condition of the transmission lines is monitored. When the response time exceeds a specified upper limit, the number of data connections is to be increased. This is done by dividing one of buffers in the transmitting side. When the response time becomes below a certain specified lower limit, the number of data connections is reduced.

And the received supervising acknowledge command includes number of the present accessed clients, the maximum accessible clients, the present used band width of transmission lines and the allocated band width of the transmission lines. By checking the data, the status of the file server 13 can be monitored, and dynamic decision of the number of data connections is possible.

The file transmitting and receiving through a data connection is possible at any point of the allocated data file segment. Therefore data receiving can be re-started successively from the normally received portion of a divided file, even if a connection is terminated and a new connection is established during file transferring. The identification of the received data file segment by the re-started transferring is done by checking size, name and time & date. Even when one of data connections is terminated, by re-organizing the data file segments among data connections the complete original file is constructed.

According to the present invention comprising a method of transferring file through multiple data connections, an apparatus based on the method and a recorded media which contains program codes of the method, the two data transferring by two data connections always finish at the same time, and the higher efficient connection can cover the lesser one. When the data transmission rate of the data connection is fluctuated, the both connections resources can be always effectively utilized.

It is not necessary to calculate the division point for file segmentation when a file is to be transmitted through multiple data connection.

The present invention provides a method of using multiple connections which gives more wide band width of data transmission than by prior art method using only one connection.

The present invention also provides a method of getting optimum number of connections dynamically depending upon the size of transferred file and the status of transmission line capability, and an optimum band width is serviced. Client operators can do their jobs independently without any involvement to the described communication control processing by the present invention.

And at least one of data connections is disturbed and an abnormal drop of the data transmission rate or a disconnection happens, the present invention provides a method to receive the remaining portion of the interrupted file successively from the normally received portion of the file to be transferred. When data file transferring is to be restarted at an arbitrary interrupted point, actual transferring operation is done in only case of successful checking of the file index information including error correction information. And hence the identity of the transferred file is guaranteed and high reliability is assured.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of transferring a file by two simultaneous data transmissions, said method comprising the steps of:
   transmitting data in a forward direction starting from a first specified position to a bottom in the file; and
   transmitting data in a backward direction starting from a second specified position to a top in the file.

2. A method of claim 1, wherein the first specified position is the top of the file and the second specified position is the bottom of the file.

3. A method of claim 2, wherein the file transferring is finished when the two data transmissions in the forward and backward directions reach at a same position in the file.

4. A method of claim 1, wherein the first position and the second position are the same point in the file.

5. A method of claim 4, wherein the file transferring is finished when the data transmission in the forward direction reaches the bottom of the file and the data transmission in the backward direction reaches the top of the file.

6. A method of claim 1, wherein the data transmission in the forward direction is done by the first connection, and the data transmission in the backward direction is done by the second connection.

7. A method of claim 1, wherein using only one connection the forward direction and the backward direction transmissions are alternatively done at every specified interval points in the file.

8. A method of transferring a file comprising the steps of:
   establishing a first connection by which a data is transmitted in a forward direction started from a top of a file to be transferred, and at the same time, establishing a second connection by which a data is transmitted in a backward direction started from a bottom of the file; and
   establishing a third connection by which a data is transmitted in a backward direction started from a certain point around an effective center area of the file, and at the same time, establishing a fourth connection by which a data is transmitted in a forward direction started from the point around the effective center area of the file.

9. A method of transferring a file comprising the steps of:
   establishing a first connection by which a data is transmitted in a forward direction started from a top of a file to be transferred; at the same time, establishing a second connection by which a data is transmitted in a backward direction started from a bottom of the file;
   establishing a third connection by which a data is transmitted alternatively in a forward direction and a backward direction at every specific unit data from a certain point around the effective center area of the file.

10. An apparatus for transferring a file by two simultaneous data transmissions, said apparatus comprising:
    means for transferring the file in a forward direction starting from a first specified position in the file; and
    means for transferring the file in a backward direction starting from a second specified position in the file.

11. A recorded media for storing control program codes which enables two simultaneous data transmissions by transmitting data in a forward direction starting from a first position in a file, and by transmitting data in a backward direction starting from a second position in the file.

12. A method of transferring a file in FTP (File Transfer Protocol: RFC959) comprising the steps of:
    establishing a control connection;
    establishing multiple data connection;

dividing the file into segments from each arbitrary point in the file;

transferring segments from each of the multiple data connections, respectively; and synthesizing the file from the segments transferred through the multiple data connections.

13. A method of claim 12, wherein said dividing step includes a step of determining the number of transferring start points in the file as many as the number of the multiple data connections.

14. A method of claim 13, wherein said dividing step includes a step of dividing the file into the segments at the transferring start points, and wherein said transferring step includes a step of sending to and receiving from the data connection via transferring buffers.

15. A method of claim 12, wherein said method further comprises a step of determining the number of data connections depending upon the size of the file to be transferred and command response time after said control connection establishing step is executed.

16. A method of claim 15, wherein the command response time is obtained by measuring the time spent for establishment of control connection and by measuring the response time from the supervising command transmit to the acknowledge and status information reception.

17. A method of claim 16, wherein the received acknowledge and status information to the transmitted supervising command contain the values of (present number of accesses)/(possible maximum number of accesses) and (present used band width)/(allocated band width).

18. A method of claim 15, wherein the response time is periodically measured.

19. A method of claim 15, wherein each of the number of data connections is monitored, and re-determination of necessary number of data connections and re-allocation of data connections are dynamically done depending upon fluctuation of the file transmission efficiency of at least one of the data connections.

20. A method of claim 12, wherein all of said steps are done by GET or PUT command issue in the client side.

* * * * *